(12) United States Patent
Ishigaki et al.

(10) Patent No.: US 6,526,951 B2
(45) Date of Patent: Mar. 4, 2003

(54) ELECTROMAGNETIC VALVE FOR ORVR SYSTEM

(75) Inventors: Satoshi Ishigaki, Kariya (JP); Yasunori Kobayashi, Toyohashi (JP)

(73) Assignee: Denso Corporation, Aichi-pref (JP)

( * ) Notice: Subject to any disclaimer, the term of this patent is extended or adjusted under 35 U.S.C. 154(b) by 0 days.

(21) Appl. No.: 09/789,841

(22) Filed: Feb. 22, 2001

(65) Prior Publication Data

US 2001/0017160 A1 Aug. 30, 2001

(30) Foreign Application Priority Data

Feb. 25, 2000 (JP) ........................................ 2000-049447

(51) Int. Cl.[7] .............................................. F02M 33/02
(52) U.S. Cl. .................... 123/519; 123/520; 251/129.17
(58) Field of Search .................................. 123/520, 519, 123/518, 516; 251/129.17, 129.15, 129.2, 335.2; 137/522

(56) References Cited

U.S. PATENT DOCUMENTS

| | | | | |
|---|---|---|---|---|
| 4,988,074 A | * | 1/1991 | Najmolhoda | 251/129.08 |
| 5,020,771 A | * | 6/1991 | Nakatsukasa et al. | 251/129.05 |
| 5,280,775 A | * | 1/1994 | Tanamura et al. | 123/518 |
| 5,599,003 A | * | 2/1997 | Seemann et al. | 251/129.2 |
| 6,079,435 A | * | 6/2000 | Franz et al. | 137/82 |

FOREIGN PATENT DOCUMENTS

| | | |
|---|---|---|
| JP | 7-233882 | 9/1995 |
| JP | 8-93576 | 4/1996 |

* cited by examiner

*Primary Examiner*—Willis R. Wolfe
*Assistant Examiner*—Mahmoud Gimie
(74) *Attorney, Agent, or Firm*—Nixon & Vanderhye PC

(57) ABSTRACT

A valve member includes a first communication passage for allowing a first passage to communicate with a first pressure chamber. When a pressure-receiving member contacts the valve member, a communication between the first communication passage and the first pressure chamber is shut. Magnetic force of a permanent magnet urges a shaft toward the pressure-receiving member. While a coil is not energized, when pressure inside a second passage rises, the pressure-receiving member leaves the valve member due to pressure difference between pressure inside the first pressure chamber and pressure inside a second pressure chamber, so that the first passage communicates with the second passage through the first communication passage. When the coil is energized, magnetic repelling force is introduced between a stator core and the permanent magnet, so that the pressure-receiving member and the shaft depart from the valve member to allow the first passage to communicate with the second passage.

12 Claims, 6 Drawing Sheets

US 6,526,951 B2

ELECTROMAGNETIC VALVE FOR ORVR SYSTEM

CROSS REFERENCE TO RELATED APPLICATION

This application is based on and incorporates herein by reference Japanese Patent Application No. 2000-49447 filed on Feb. 25, 2000.

BACKGROUND OF THE INVENTION

1. Field of the Invention

The present invention relates to an electromagnetic valve working as a pressure regulating valve and an opening/closing valve suitable for use in an ORVR system.

2. Description of Related Art

A conventional vapor fuel treating system requires an ORVR (On Board Refueling Vapor Recovery) system shown in FIG. 7. In the ORVR system, vapor fuel arising in a fuel tank during fuel supply is not discharged to atmosphere, and a canister adsorbs the vapor fuel.

In the ORVR system shown in FIG. 7, pipes 202 and 205 connect a fuel tank 200 with a canister 210. A pressure sensor 201 is provided in the fuel tank 200 for detecting pressure inside the fuel tank 200. When a vapor fuel leak is detected, an electromagnetic valve 203 opens to allow the fuel tank 200 to communicate with the canister 210. An internal pressure valve 204 includes a diaphragm, and maintains the pressure inside the fuel tank 200 over a predetermined pressure. A fuel supply valve 206 includes a diaphragm. When the pressure inside the fuel tank 200 rises due to a fuel supply, the fuel supply valve 206 opens to discharge the vapor fuel into the canister 210 such that the canister 210 adsorbs the vapor fuel. When a purge valve 213 opens, an intake air passage 208 communicates with the canister 210.

In the conventional ORVR system in FIG. 7, there is need to prepare a lot of valves and pipes such as two pipes 202, 205 for connecting the fuel tank 200 with the canister 210, electromagnetic valve 203, internal pressure valve 204, and supply valve 206. Thus, an installation space for these parts is necessary, and the number of installations is increased.

SUMMARY OF THE INVENTION

An object of the present invention is to provide an electromagnetic valve working as pressure regulating valve and opening/closing valve, for reducing the number of parts.

According to a first aspect of the present invention, when a coil is not energized, a pressure-receiving member switches a communication between a first passage and a second passage due to pressure difference between a first pressure chamber and a second pressure chamber. That is, an electromagnetic valve works as a pressure regulating valve. When the coil is electrically energized, the first passage communicates with the second passage regardless the pressure difference between the first pressure chamber and the second pressure chamber. That is, the electromagnetic valve works as an electromagnetic opening/closing valve.

In this way, a single electromagnetic valve works as pressure regulating valve and opening/closing valve. Thus, the number of parts is reduced, so that the system is easily assembled. The system is compacted, so that the system is easily installed in a narrow space.

According to a second aspect of the present invention, a stator magnetically attracts the permanent magnet provided in the moving core. A communication between the first passage and the second passage is shut when the moving core is close to the stator. Thus, even when the magnetic force of the permanent magnet is small, sufficient force for closing valve is attained. Further, the coil is energized to generate a magnetic repelling force between the permanent magnet and the stator, so that the moving core leaves the stator. Since air gap between the moving core and the stator is small, even when the wind number of the coil is small, the electromagnetic valve can open, thereby compacting the electromagnetic valve.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

Figure 2:
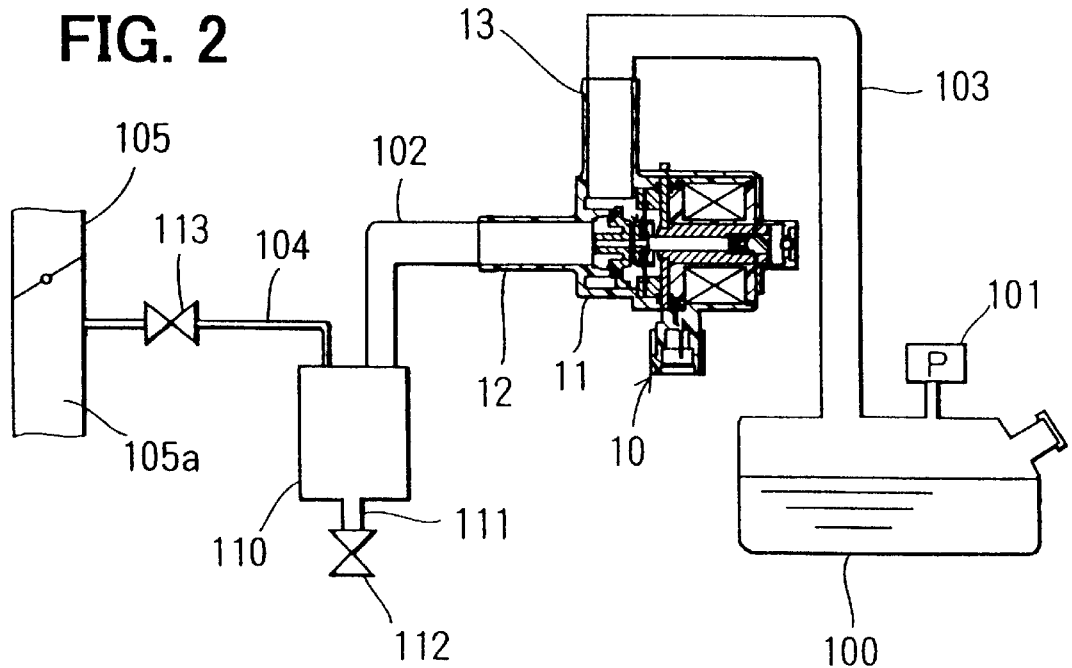
FIG. 2 is a schematic view showing an ORVR system including the electromagnetic valve.

FIG. 2 shows an ORVR (On Board Refueling Vapor Recovery) system including an electromagnetic valve 10. A fuel tank 100 communicates with a canister 110 through pipes 102 and 103. A housing 11 of the electromagnetic valve 10 includes a first connecting pipe 12 and a second connecting pipe 13. The first connecting pipe 12 connects with the pipe 102, and the second connecting pipe 13 connects with the pipe 103. A pressure sensor 101 detects a pressure inside the fuel tank 100 to detect a vapor fuel leak.

The canister 110 adsorbs the vapor fuel. When an electromagnetic valve 112 opens, the canister 110 is exposed to the atmosphere through a pipe 111. The canister 110 communicates with an intake pipe 105 through a pipe 104. A purge valve 113 provided in the pipe 104 opens, the canister 110 and the pipe 102 communicate with an intake air passage 105a.

Figure 1:
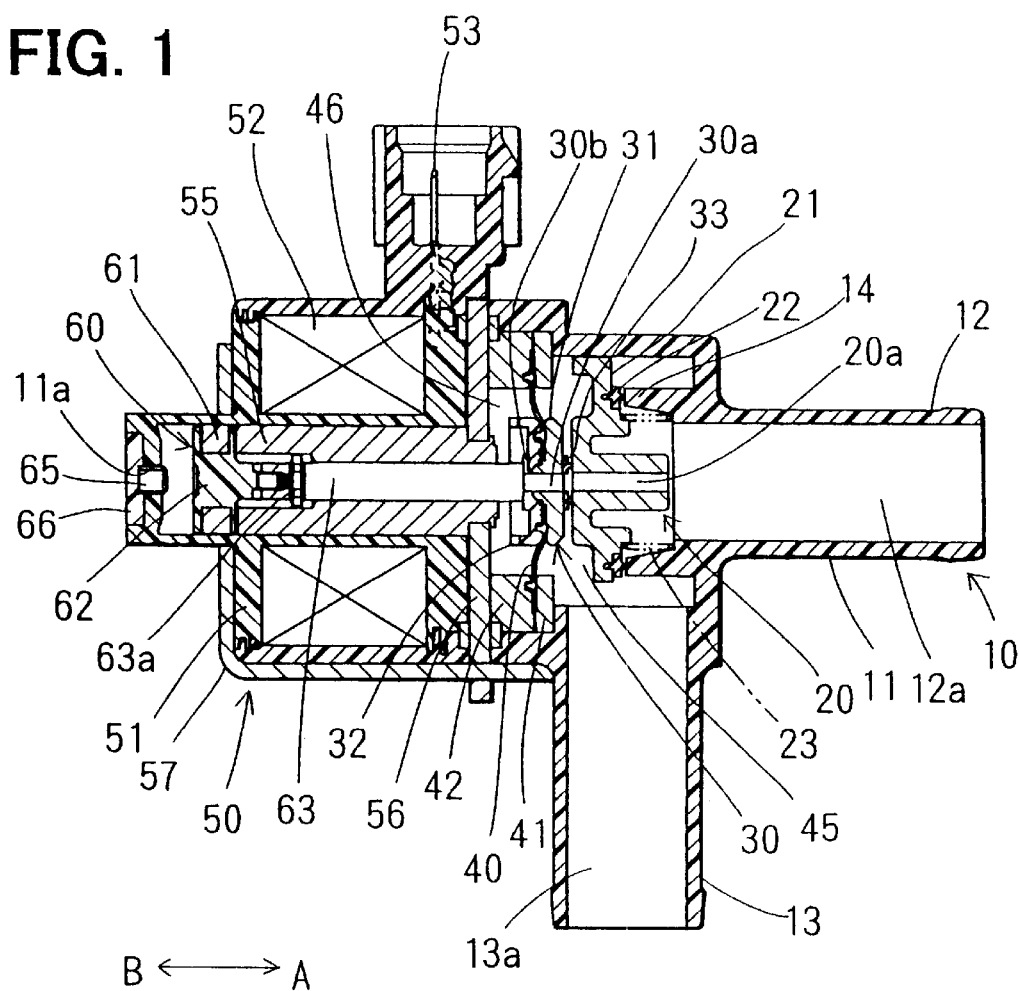
FIG. 1 is a cross-sectional view showing an electromagnetic valve.

As shown in FIG. 1, the housing 11 of the electromagnetic valve 10 is made of resin. A first passage 12a is formed within the first connecting pipe 12, and a second passage 13a is formed within the second connecting pipe 13. A valve seat 14 is formed at the end of the first connecting pipe 12 inside the housing 11.

A valve member 20 includes a valve body 21 and a contacting portion 22 made of rubber. The contacting portion 22 is capable of seating on the valve seat 14. A first communication passage 20a penetrates through the center of the valve body 21, so that the first passage 12a is capable of communicating with a first pressure chamber 45. A spring 23 urges the valve member 20 toward a pressure-receiving member 30.

The pressure-receiving member 30 separates the first pressure chamber 45 from a second pressure chamber 46. The first pressure chamber 45 communicates with the second passage 13a. A pressure-receiving area of the valve member 20, which receives a pressure from the first passage 12a, is the same as a pressure-receiving area of the pressure-receiving member 30, which receives a pressure from the second pressure chamber 46. The pressure-receiving member 30 includes a contacting side member 31, a shaft side member 32, a contacting portion 33 made of rubber, and a diaphragm 40. The inner periphery of the diaphragm 40 is pinched between the contacting side member 31 and the shaft side member 32, and the outer periphery thereof is pinched between a first plate 41 and a second plate 42. A through hole penetrates through the centers of the contacting side member 31 and the shaft side member 32 to form a second communication passage 30a. The second communication passage 30a includes a side hole 30b communicating with the second pressure chamber 46. When the contacting portion 33 of the pressure-receiving member 30 contacts the valve body 21 at the outer periphery of the first communication passage 20a, communication between the first communication passage 20a and the first pressure chamber 45 is shut.

An electromagnetic operating unit 50 includes a coil 52 wound around a spool 51, a stator core 55, an end core 56, a yoke 57 and a moving core 60. The coil 52 is electrically connected to a terminal 53. The stator core 55, the end core 56 and the yoke 57 are made of magnetic material, and form a stator. The moving core 60 includes a permanent magnet 61, a resin portion 62, and a shaft 63. The resin portion 62 molds the permanent magnet 61 and is screwed to the shaft 63. A screw 65 is screwed into an adjust hole 11a of the housing 11, and the screw 65 is fixed by a potting resin 66.

When the coil 52 is not energized, the permanent magnet 61 is attracted to the stator core 55, so that the moving core 60 is attracted rightwardly in FIG. 1 (arrow A direction). Here, FIG. 1 shows a state that the coil 52 is not energized in the electromagnetic valve 10.

The left end 63a of the shaft 63 is formed in X-shape extending radially outwardly. The stator core 55 includes a X-shaped groove at the inside wall thereof, and the left end 63a is fit into the X-shaped groove. An adjuster is inserted through the adjust hole 11a to adjust a screwed amount of the resin portion 62, so that an attraction force between the permanent magnet 61 and the stator core 55, which is a closing valve force of the electromagnetic valve 10, is adjusted. Here, since the left end 63a of the shaft 63 is fit into the X-shape groove of the stator core 55 and does not rotate, the closing valve force of the electromagnetic valve 50 is adjusted while the shaft 63 is inserted into the stator core 55. After the screwed amount of the resin portion 62 is adjusted, the screw 65 seals the adjust hole 11a, and the potting resin 66 molds the screw 65.

An operation of the electromagnetic valve 10 will be explained.

Figure 3A:
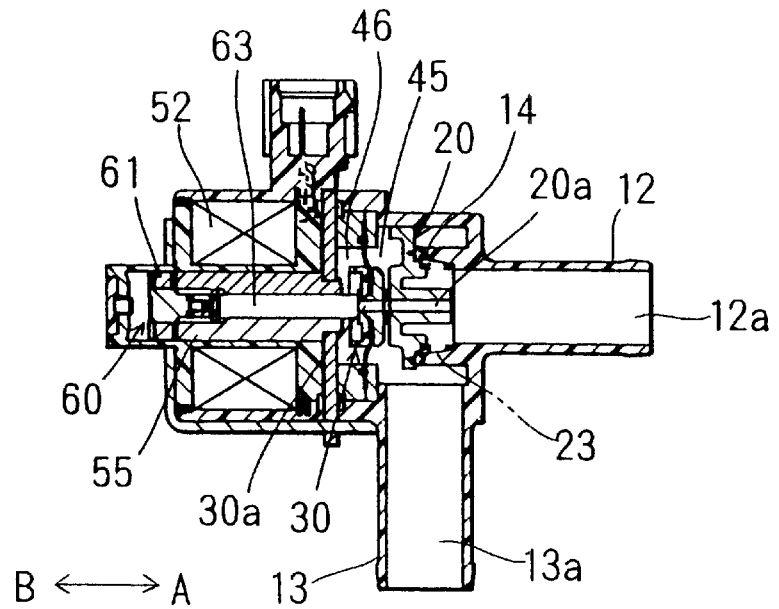
FIGS. 3A and 3B are cross-sectional views showing an operation of the electromagnetic valve while a coil is not energized.

As shown in FIG. 3A, when the coil 52 is not energized, the attraction force between the permanent magnet 61 and the stator core 55 urges the moving core 60 rightwardly (arrow A direction). The pressure receiving member 30 contacts the valve member 20, and is urged toward the shaft 63. The valve member 20 seats on the valve seat 14 against the urging force of the spring 23.

In the state shown in FIG. 3A, since the first passage 12a communicates with the second pressure chamber 46 through the first and second communication passages 20a and 30a, pressure inside the first passage 12a is the same as inside the second pressure chamber 46.

Figure 3B:
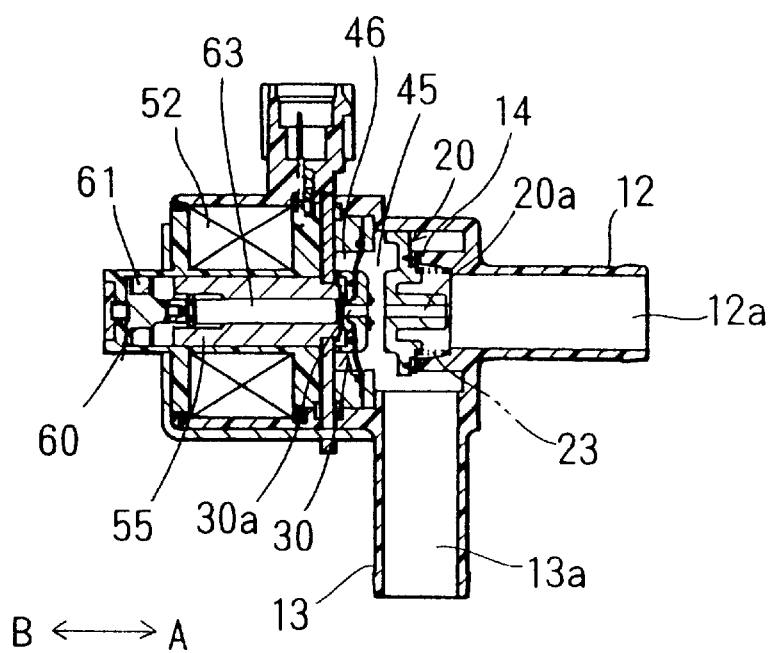

When pressure inside the second passage 13a and the first pressure chamber 45 rises due to a pressure rise inside the fuel tank 100, pressure difference between the first pressure chamber 45 and the second pressure chamber 46 increases, thereby increasing a force urging the pressure receiving member 30 toward an arrow B direction. Thus, as shown in FIG. 3B, the pressure receiving member 30 moves toward the arrow B direction while repelling the attraction force between the permanent magnet 61 and the stator core 55. Here, the valve member 20 seats on the valve seat 14 due to pressure difference between the first pressure chamber 45 and the first passage 12a. Since the pressure receiving member 30 leaves the valve member 20, the second passage 13a and the first pressure chamber 45 communicate with the first passage 12a through the first communication passage 20a. When the first passage 12a communicates with the second passage 13a, the vapor fuel inside the fuel tank 100 is discharged to the canister 110, and adsorbed by the canister 110.

Figure 4A:
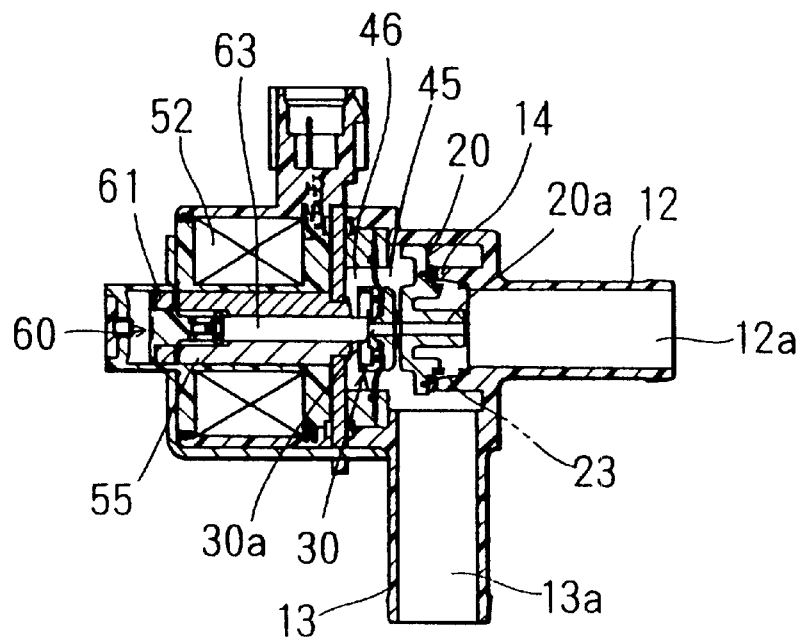
FIGS. 4A and 4B are cross-sectional views showing an operation of the electromagnetic valve while vapor fuel leak is detected.
Figure 4B:
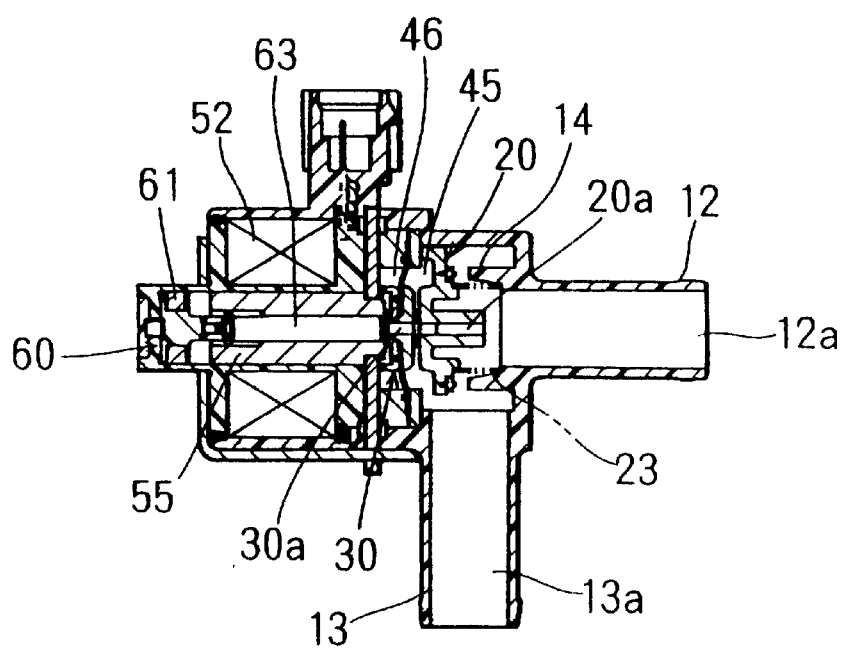
Figure 5:
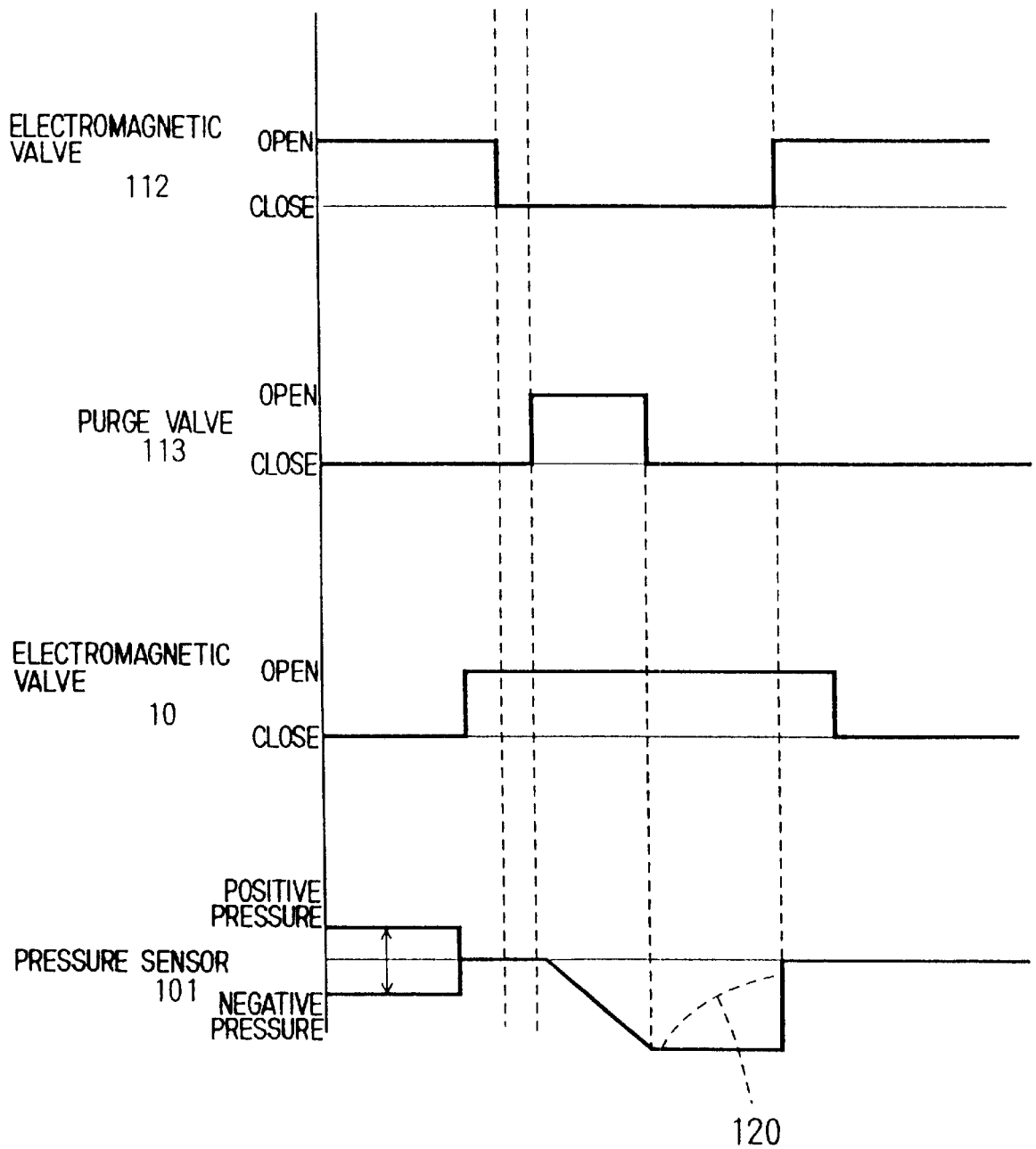
FIG. 5 is a graph showing an opening/closing state of each valve and an output signal of a pressure sensor.

When the vapor fuel leak in the ORVR system is detected, the electromagnetic valve 112 opens, as shown in FIG. 5, to expose the canister 110 to the atmosphere. Pressure inside the fuel tank 100 may be either of positive or negative pressure. Next, the coil 52 is energized under a valve closing state shown in FIG. 4A. The coil 52 is energized such that the stator core 55 generates a repulsion force against the magnetic force 61 between the stator core 55 and the permanent magnet 61. Then, as shown in FIG. 4B, the permanent magnet 61 repels the stator core 55, and the moving core 60 moves toward the arrow B direction. When the moving core 60 moves toward the arrow B direction, the pressure receiving member 30 and the valve member 20 move toward the arrow B direction by the urging force of the spring 23. Then, the valve member 20 leaves the valve seat 14, and the first passage 12a communicates with the first pressure chamber 45 and the second passage 13a through an opening between the valve member 20 and the valve seat 14.

When the first passage 12a communicates with the second passage 13a, both electromagnetic valve 112 and the purge valve 113 open as shown in FIG. 5, the intake air passage 105a communicates with the fuel tank 100 through the pipes 102, 103 and 104. Here, when there is no leak in the pipes 102, 103 and 104 and the fuel tank 100, pressure inside the fuel tank 100 reaches a constant negative pressure as shown in FIG. 5. When there is a leak somewhere, pressure inside the fuel tank 100 increases as shown by broken line 120 in FIG. 5. In this way, pressure inside the fuel tank 100 is detected to detect a leak in the ORVR system.

Figure 6A:
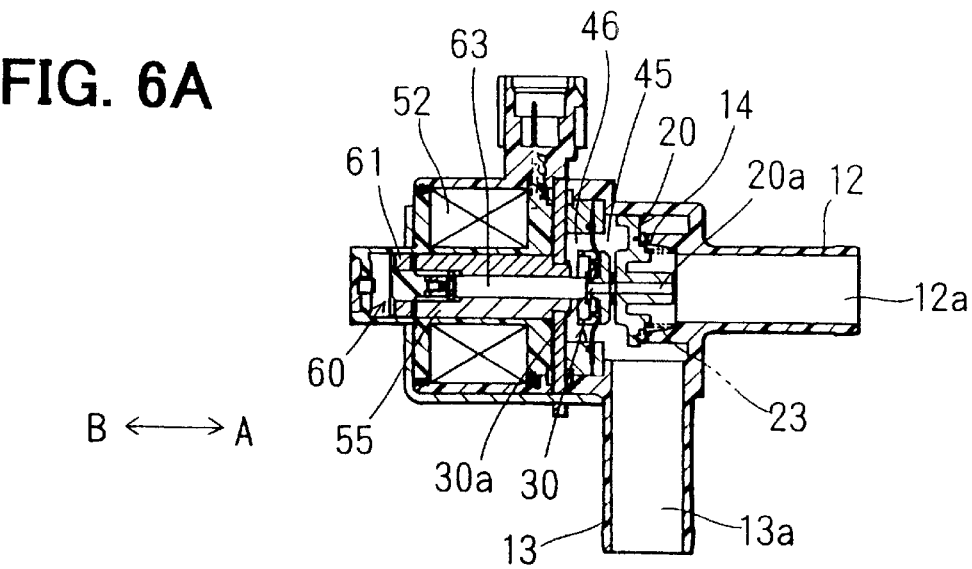
FIGS. 6A–6C are cross-sectional views showing an operation of the electromagnetic valve during fuel supply.
Figure 6B:
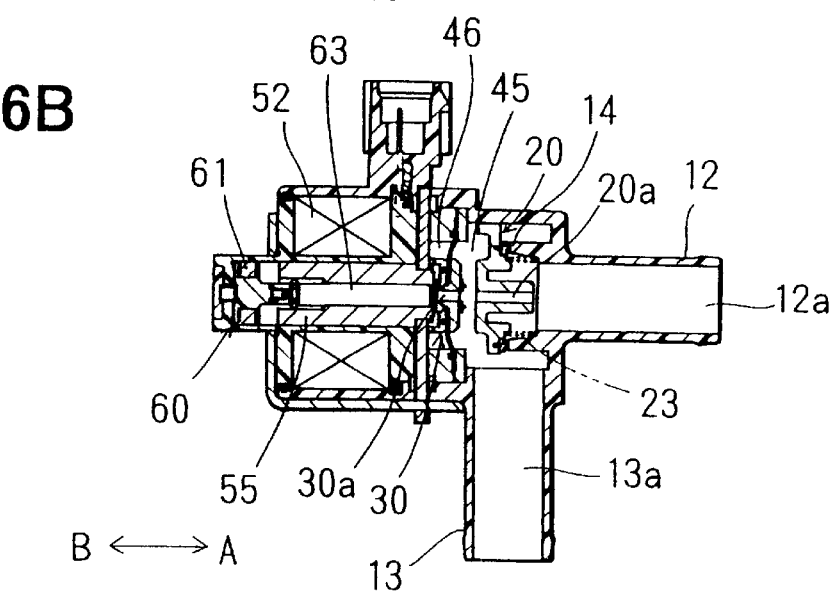

When a cover of the fuel tank is opened for fuel supply, the coil 52 of the electromagnetic valve 52 is energized. When the coil 52 is energized by opening the cover of the fuel tank 100 under a valve closing state shown in FIG. 6A, the moving core 60 and the pressure receiving member 30 move toward the arrow B direction as shown in FIG. 6B. While the fuel is supplied, pressure inside the fuel tank 100 rises, and pressure difference between inside the fuel tank 100 and inside the canister 101 becomes over a predetermined value, so that the valve member 20 keeps seating on the valve seat 14 due to the pressure inside the second passage 13a. In this state, the first passage 12a communicates with the second passage 13a through the first communication passage 20a.

Figure 6C:
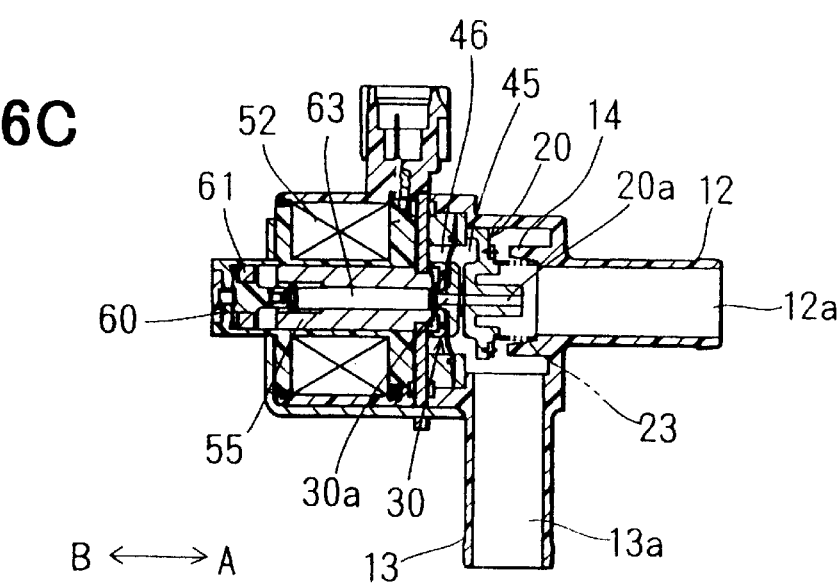
Figure 7:
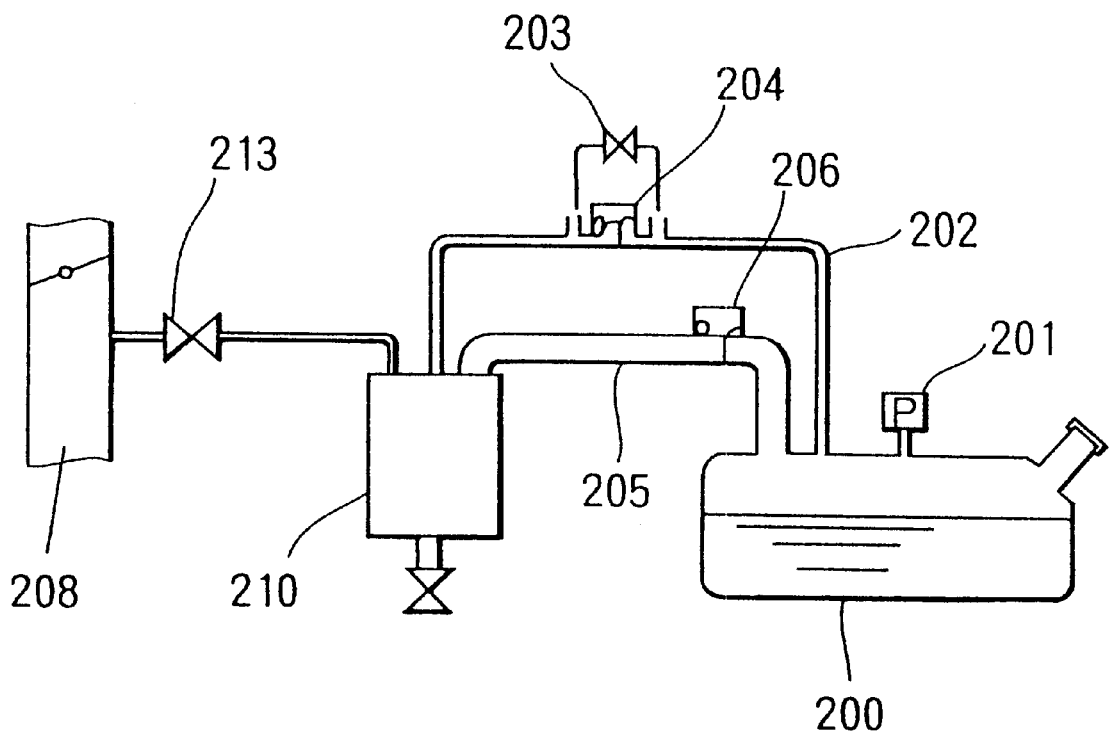
FIG. 7 is a schematic view showing a conventional ORVR system.

When the vapor fuel in the fuel tank 100 is discharged and pressure inside the fuel pressure 100 decreases and the pressure difference becomes under the predetermined value, the valve member 20 leaves the valve seat 14 as shown in FIG. 6C. Then, the first passage 12a communicates with the second passage 13a through the opening between the valve member 20 and the valve seat 14. Here, cross-sectional area of the opening between the valve member 20 and the valve seat 14 is larger than cross-sectional area of the first communication passage 20a. Since the first passage 12a communicates with the second passage 13a regardless the valve member 20 leaves the valve seat 14 or not, the vapor fuel arising in the fuel tank during the fuel supply is discharged toward the canister 110 to be adsorbed by the canister 110.

In the present embodiment, the permanent magnet 61 attached to the moving core 60 is attracted to the stator core 55, the moving core 60 urges the pressure receiving member 30 to contact the valve member 20, and the valve member 20 seats on the valve seat 14, for shutting the communication between the first passage 12a and the second passage 13a.

Contrary to this, when a permanent magnet is not used and an elastic member such as a spring urges a moving core to be apart from the stator core to make the pressure receiving member 30 to contact the valve member 20 and the valve member 20 seats on the valve seat 14, a coil has to be energized while the moving core is apart from the stator core to attract the moving core toward the stator core. Thus, a large magnetic force is required to attract the moving core toward the stator core. For generating the large magnetic force, the wind number of the coil has to be increased, thereby enlarging an electromagnetic operating unit.

Further, according to the present invention, the electromagnetic valve 10 starts to open under the state that the permanent magnet 61 abuts on the stator core 55 and the first passage 12a does not communicate with the second passage 13a. As an air gap between the permanent magnet 61 and the stator core 55 decreases, an attraction force due to a magnetic force generated therebetween increases. Thus, even when the permanent magnet 61 is small, a large force for closing valve is attained.

According to the present embodiment, the coil 52 is energized such that magnetic pole repelling the permanent magnet 61 is generated in the stator core 55 facing the permanent magnet 61, so that the permanent magnet 61 leaves the stator core 55. Here, since the air gap between the permanent magnet 61 and the stator core 55 is small, the repelling force generated between the permanent magnet 61 and the stator core 55 is large. Thus, even when the magnetic force generated by the coil 52 is small, the permanent magnet 61 leaves the stator core 55. The wind number of the coil 52 can be decreased, thereby compacting the electromagnetic valve.

In the above-described embodiments, the pressure receiving member 30 moves due to a pressure difference between the first pressure chamber 45 and the second pressure chamber 46, and the electromagnetic valve 10 operates as a pressure adjusting valve. When the coil 52 is energized to move the pressure receiving member 30 apart from the valve member 20, the first passage 12a communicates with the second passage 13a regardless the valve member 20 leaves the valve seat 14 or not, so that the electromagnetic valve 10 works as a opening/closing valve.

In this way, the electromagnetic valve 10 working as pressure adjusting valve and opening/closing valve is used in the ORVR system. That is, a single electromagnetic valve 10 regulates the pressure inside the fuel tank 100 under a predetermined pressure, discharges the vapor fuel arising during fuel supply into the canister 110, and detects the vapor fuel leak. Further, a pipe connection line is simplified. Thus, the number of parts is reduced, so that the system is easily assembled. The system is compacted, so that the system is easily installed in a narrow space.

According to the present embodiment, the pressure receiving area of the valve member 20 receiving a pressure from the first passage 12a is almost the same as the pressure receiving area of the pressure receiving member 30 receiving a pressure from the second pressure chamber 46. When the pressure receiving member 30 shuts the communication between the first communication passage 20a and the first pressure chamber 45, the first communication passage 20a communicates with the second pressure chamber 46 through the second communication passage 30a. When the valve member 20 contacts the pressure receiving member 30 and seats on the valve seat 14, pressure inside the second pressure chamber 46 is the same as pressure inside the first passage 12a. Thus, a force the valve member 20 receives from the first passage 12a cancels a force the pressure receiving member 30 receives from the second pressure chamber 46.

The magnet force of the permanent magnet 61 can be reduced, since the pressure receiving area of the valve member 20 receiving pressure from the first passage 12a is larger than the pressure receiving area of the pressure receiving member 30 receiving pressure from the second pressure chamber 46. The urging force of the spring 23 can be reduced since the pressure receiving area of the pressure receiving member 30 receiving pressure from the second pressure chamber 46 is larger than the pressure receiving area of the valve member 20 receiving pressure from the first passage 12a. Therefore, the size of electromagnetic valve 10 can be compacted.

According to the present embodiment, the stator core 55 magnetically attracts the permanent magnet 61, and the communication between the first passage 12a and the second passage 13a is shut when the permanent magnet 61 abuts on the stator core 55. Thus, even when the magnetic force of the permanent magnet 61 is small, sufficient force for closing valve is attained. The coil 52 is energized to generate a magnetic repelling force between the permanent magnet 61 and the stator core 55, so that the permanent magnet 61 leaves the stator core 55. Even when the wind number of the coil 52 is small, the electromagnetic valve 10 can open, thereby compacting the electromagnetic valve 10.

MODIFICATIONS

A moving core may be formed by magnetic material instead of the permanent magnet 61 and the resin portion 62 in the above-described embodiment, and a permanent magnet may be attached to the stator core 55. When the coil 52 is not energized, the moving core is attracted to the stator core 55 due to the magnetic force of the permanent magnet attached to the stator core 55. When the coil 52 is energized such that a magnetic flux of which the direction is opposite to a magnetic flux direction of the permanent magnet is generated within the stator core 55, the magnetic attraction force between the moving core and the stator core 55 decreases. At this time, the moving core leaves the stator core 55 due to the urging force of the spring 23 urging the valve member 20 toward the pressure-receiving member 30.

A spring may urge the moving core to leave the stator core 55 to close an electromagnetic valve, and a coil may be energized to attract the moving core toward the stator core to open the electromagnetic valve.

According to the above-described embodiment, an electromagnetic valve is applied to an ORVR system. Alternatively, the electromagnetic valve in the present invention may be applied to a system in which a pressure is adjusted between two pressure sources and a communication therebetween is made if necessary.

What is claimed is:

1. An electromagnetic valve, comprising:
   a housing including a first passage, a second passage, a first pressure chamber communicating with said second passage, and a second pressure chamber;
   a moving core reciprocating in said housing;
   a stator provided in said housing and magnetically acting on said moving core;
   a first urging means for urging said moving core toward one direction in a reciprocating direction of said moving core;
   a coil generating a magnetic force between said moving core and said stator for moving said moving core toward the other direction in the reciprocating direction of said moving core;
   a pressure receiving member provided in said housing, said pressure receiving member located at the one direction side of said moving core and partitioning said first pressure chamber from said second pressure chamber, said pressure receiving member being operable by said moving core in the reciprocating direction;
   a valve member provided at a side of said pressure receiving member opposite to said moving core, said valve member including a first communication passage allowing said first passage to communicate with said first pressure chamber, said valve member being movable independently upon said pressure receiving member;
   a valve seat provided in said housing, on which said valve member seats; and
   a second urging means for urging said valve member toward said pressure receiving member, wherein
   said second pressure chamber is located at a moving core side of said pressure receiving member,
   when said pressure receiving member contacts said valve member, a communication between said first communication passage and said first pressure chamber is shut,
   when said valve member seats on said valve seat while said pressure receiving member shuts the communication between said first communication passage and said first pressure chamber, a communication between said first pressure chamber and said first passage is shut, and said pressure receiving member is movable in response to a pressure difference between said first pressure chamber and said second pressure chamber to allow a flow from said second passage to said first passage.

2. The electromagnetic valve according to claim 1, wherein a pressure-receiving area of said pressure receiving member, which receives a pressure from said second pressure chamber, is approximately the same as a pressure-receiving area of said valve member, which receives a pressure from said first passage.

3. The electromagnetic valve according to claim 2, wherein
   said pressure receiving member includes a second communication passage, and
   when said pressure receiving member shuts the communication between said first communication passage and said first pressure chamber, said second communication passage allows said first communication passage to communicate with said second pressure chamber.

4. The electromagnetic valve according to claim 1, wherein
   said moving core includes said first urging means,
   said first urging means urges said moving core toward said stator, and
   the magnetic force generated by said coil moves said moving core to depart from said stator.

5. The electromagnetic valve according to claim 4, wherein
   said first urging means includes a permanent magnet, and
   said moving core is attracted to said stator due to a magnetic force of said permanent magnet.

6. The electromagnetic valve according to claim 1, wherein said electromagnetic valve is adapted to be installed between a fuel tank and a canister for adsorbing fuel vapor, said first passage is adapted to communicate with the canister, and said second passage is adapted to communicate with the fuel tank.

7. The electromagnetic valve according to claim 6, wherein said valve member allows a communication between said fuel tank and said canister when said coil is energized, said pressure receiving member and said valve member shut the communication between said fuel tank and said canister when said coil is not energized and a pressure in said fuel tank is lower than that in said canister, and said pressure receiving member and said valve member allows the communication between said fuel tank and said canister when said coil is not energized and a pressure in said fuel tank is higher than that in said canister by a predetermined pressure.

8. An electromagnetic valve, comprising:
   a housing which defines a first passage, a second passage, a chamber and a valve seat disposed on said first passage;
   a valve member disposed in said housing, said valve member cooperating with said valve seat, said valve member having a first communicating passage which provides a communication between said first communicating passage and said chamber while said valve member seats on said valve seat;
   a pressure receiving member disposed behind said valve member in said housing, said pressure receiving member being movable independently upon said valve member, said pressure receiving member dividing said chamber into a first pressure chamber communicating with said second passage and a second pressure chamber, said pressure receiving member being arranged to close said first communicating passage when said pressure receiving member contacts with said valve member, and said pressure receiving member being arranged to open said first communicating passage when said pressure receiving member is separated from said valve member;
   an electromagnetic operating unit disposed on said housing, said electromagnetic operating unit including a coil, a stator magnetized when said coil is energized, and a moving core driven by said coil and said stator, said moving core being operative to said pressure receiving member;
   a first urging means for urging said moving core in one direction in which said moving core urges said pressure receiving member on said valve member and urges said valve member on said valve seat; and a second urging means for urging said valve member toward said pressure receiving member, wherein said electromagnetic operating unit is arranged to drive said moving core when said coil is not energized so that said first urging means urges said pressure receiving member and said valve member through said moving means, and so that said pressure receiving member is movable in response to a pressure difference between said first pressure chamber and said second pressure chamber to allow a flow from said second passage to said first passage, and said electromagnetic operating unit is arranged to drive said moving core when said coil is energized so that said valve member is unseated from said valve seat by said second urging means.

9. The electromagnetic valve according to claim 8, further comprising a member that provides a second communicating passage introducing a pressure in said first passage to said second pressure chamber when said pressure receiving member contacts on said valve member.

10. The electromagnetic valve according to claim 9, wherein said pressure receiving member includes said member providing said second communicating passage.

11. The electromagnetic valve according to claim 8, wherein said electromagnetic valve is adapted to be installed between a fuel tank and a canister for adsorbing fuel vapor, said first passage is adapted to communicate with the canister, and said second passage is adapted to communicate with the fuel tank.

12. The electromagnetic valve according to claim 8, wherein said valve member is larger in diameter than said valve seat so that the valve member alone is not movable to communicate said first passage and said second passage when a pressure in said second passage is higher than that in said first passage.

* * * * *